United States Patent
Zheng et al.

(10) Patent No.: US 8,830,978 B2
(45) Date of Patent: Sep. 9, 2014

(54) DATA COMMUNICATION METHOD, WIRELESS COMMUNICATION SYSTEM, AND BASE STATION

(75) Inventors: Yan-Xiu Zheng, Zhudong Township, Hsinchu County (TW); Ming-Bing Chen, Taipei (TW); Hao-Wen Chen, legal representative, Xinzhuang (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 523 days.

(21) Appl. No.: 12/817,379

(22) Filed: Jun. 17, 2010

(65) Prior Publication Data

US 2011/0026498 A1 Feb. 3, 2011

Related U.S. Application Data

(60) Provisional application No. 61/218,229, filed on Jun. 18, 2009.

(51) Int. Cl.
*H04J 1/00* (2006.01)
*H04L 5/00* (2006.01)
*H04W 52/02* (2009.01)

(52) U.S. Cl.
CPC ......... *H04L 5/0007* (2013.01); *H04W 52/0216* (2013.01); *H04L 5/0042* (2013.01); *H04L 5/0062* (2013.01)
USPC ........................................................ 370/343

(58) Field of Classification Search
None
See application file for complete search history.

(56) References Cited

U.S. PATENT DOCUMENTS

| 2007/0253321 A1 | 11/2007 | Akita et al. | |
|---|---|---|---|
| 2009/0175186 A1* | 7/2009 | Du et al. | 370/252 |
| 2010/0113045 A1* | 5/2010 | Iwamura et al. | 455/450 |
| 2010/0182968 A1* | 7/2010 | Ojala et al. | 370/329 |
| 2011/0128925 A1* | 6/2011 | Lindoff et al. | 370/329 |
| 2012/0195240 A1* | 8/2012 | Kim et al. | 370/311 |

FOREIGN PATENT DOCUMENTS

| EP | 1 764 942 | 3/2007 |
|---|---|---|
| TW | 200737796 | 10/2007 |
| TW | 200738008 | 10/2007 |

OTHER PUBLICATIONS

European Search Report dated Sep. 17, 2010.
Ericsson: "DEX with Carrier Aggregation in LTE-Advanced" published on Apr. 28, 2009.
Nokia Siemens Networks et al: "CSG enhanced mobility requirements" published on Apr. 28, 2009.

(Continued)

*Primary Examiner* — Gregory Sefcheck
*Assistant Examiner* — Joshua Smith
(74) *Attorney, Agent, or Firm* — McClure, Qualey & Rodack, LLP

(57) ABSTRACT

The invention provides a wireless communication system. In one embodiment, the wireless communication system comprises a base station and user equipment. The base station transmits data to user equipment via a plurality of the component carriers comprising a series of data transmission cycles, interleaves starting time of a plurality of active periods of the component carriers in each data transmission cycle in an order, and sends control data to the user equipment via the component carriers during the active periods of the component carriers. The user equipment receives the control data via the component carriers during the active periods of the component carriers.

67 Claims, 8 Drawing Sheets

(56) References Cited

OTHER PUBLICATIONS

3rd Generation Partnership Project:"3rd Generation Partnership Project; Technical Specification Group Radio Access Network; Evolved Universal Terrestrial Radio Access(E-UTRA) Medium Access Control (MAC) protocol specification (Release 8); 3GPP TS 36.321 V8.5.0" published on Oct. 21, 2009.

ITRI:"Discussion of DRX in Carrier Aggregation" published on Jun. 24, 2009.

ITRI:"Discussion of DRX in Carrier Aggregations" published on Oct. 6, 2009.

Taiwanese language office action dated Jul. 8, 2013.

English language translation of abstract of TW 200737796 (published Oct. 1, 2007).

English language translation of abstract of TW 200738008 (published Oct. 1, 2007).

* cited by examiner

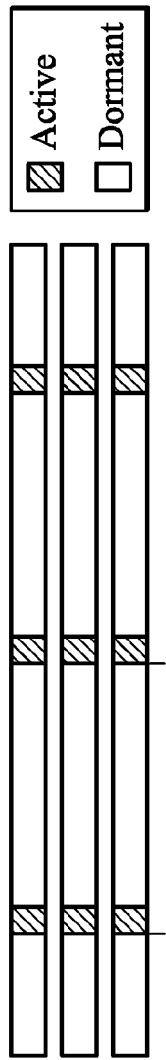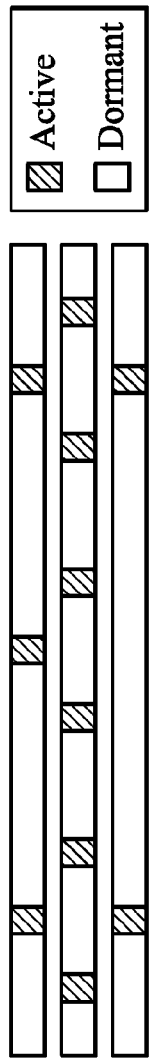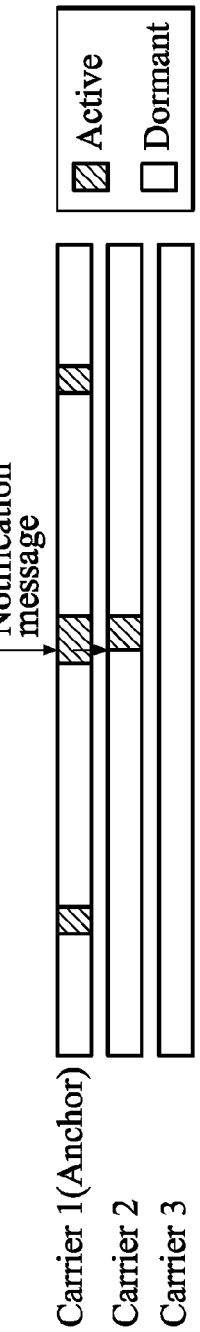

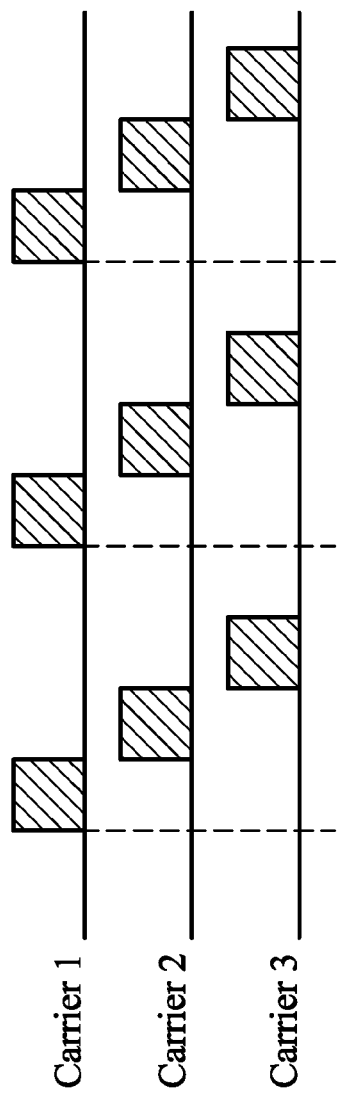
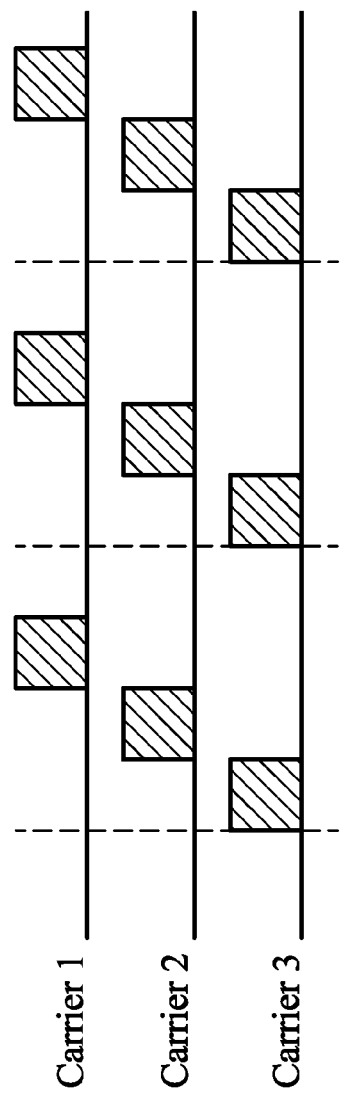

DATA COMMUNICATION METHOD, WIRELESS COMMUNICATION SYSTEM, AND BASE STATION

CROSS REFERENCE TO RELATED APPLICATIONS

This application claims the benefit of U.S. Provisional Application No. 61/218,229, filed on Jun. 19, 2009, the entirety of which is incorporated by reference herein.

BACKGROUND OF THE INVENTION

1. Field of the Invention

The invention relates to wireless communication systems, and more particularly to data transmission of wireless communication systems.

2. Description of the Related Art

A discontinuous reception (DRX) mode is an essential operation for saving energy in the 3GPP specification. A wireless communication system comprises a base station and user equipment. The user equipment is often a handheld device having a limited power supply, and reduction of power consumption of the user equipment is therefore an important issue to extend the battery life of the user equipment. FIG. 1 shows a schematic diagram of signal transmission in a discontinuous reception mode. A period is sliced into a series of periodic data transmission cycles. When the wireless communication system operates in the discontinuous reception mode, the base station only sends control signaling to the user equipment during active periods of the data transmission cycle. The user equipment, therefore, only needs to receive the control signaling during the active periods, and can enter a sleeping state with low power consumption when not in the active periods. The power consumption of the user equipment is therefore reduced to extend the battery life of the user equipment. A wireless communication system operating in a semi-persistent scheduling (SPS) mode has similar communication operations with a wireless communication system operating in the discontinuous reception mode.

A base station operating in a discontinuous reception mode transmits control data to user equipment via a plurality of the component carriers with different frequency bands. Each component carrier may have different active periods. According to the relationship between the active periods of different component carriers, the base station may send control signaling to the user equipment with three different methods. FIG. 2A shows the first schematic diagram of active periods of three component carriers according to an identical configuration method is shown. According to the identical configuration method, the active periods of the three component carriers are the same. A base station may send control signaling to the user equipment during the same active periods via the three component carriers. The active periods of the three component carriers therefore have the same configuration.

FIG. 2B shows the second schematic diagram of active periods of three component carriers according to an independent configuration method. According to the independent configuration method, the three component carriers have different active periods and the DRX cycle. A base station therefore sends control signaling to the user equipment during different active periods via the three component carriers. Because the active periods of the three component carriers have different configurations, the base station must send an increased amount of the configuration messages to the user equipment to synchronize transmission and reception of the control signaling. FIG. 2C shows the third schematic diagram of active periods of three component carriers according to an anchor carrier based method. According to the anchor carrier based method, a carrier is determined as an anchor carrier. A base station mainly sends control signaling to the user equipment via the anchor carrier during active periods. When the base station uses other component carriers, the base station sends a notification message to the user equipment via the anchor carrier in advance and user equipment receive control signaling on the activated carriers.

All the aforementioned three methods have shortcomings. According to the identical configuration method, the user equipment must comprise multiple radio frequency modules to respectively receive radio signals via the multiple component carriers at the same active time periods, and therefore consumes more power. According to the independent configuration method, the active periods of the three component carriers are different, and the base station must send extra configuration messages to synchronize transmission and reception of the control signaling. According to the anchor carrier based method, only the anchor carrier is used to transmit control signaling and other component carriers are left idle without transmitting control signaling. Thus, all of the identical configuration method, the independent configuration method, and the anchor carrier based method have deficiencies. A new method for arranging active periods of different component carriers of a wireless communication system operating in a discontinuous reception mode is therefore required to improve the performance of the wireless communication system.

BRIEF SUMMARY OF THE INVENTION

The invention provides a data communication method for a wireless communication system. In one embodiment, the wireless communication system comprises a base station and user equipment, and the base station transmits data to the user equipment via a plurality of the component carriers comprising a series of data transmission cycles. First, the starting time of a plurality of active periods of the component carriers in each data transmission cycle are interleaved in an order, so that the starting time of active periods of the component carriers may not overlap with each other. Control data is then sent from the base station to the user equipment via the component carriers during the active periods of the component carriers. The control data is then received by the user equipment via the component carriers during the active periods of the component carriers.

The invention provides a wireless communication system. In one embodiment, the wireless communication system comprises user equipment and a base station. The base station transmits data to the user equipment via a plurality of the component carriers comprising a series of data transmission cycles, interleaves the starting time of a plurality of active periods of the component carriers in each data transmission cycle in an order, so that the starting time of the active periods of the component carriers may not overlap with each other, and sends control data to the user equipment via the component carriers during the active periods of the component carriers. The user equipment then receives the control data via the component carriers during the active periods of the component carriers.

The invention provides a base station. The base station is wirelessly coupled to user equipment via a plurality of the component carriers comprising a series of data transmission cycles. In one embodiment, the base station comprises a control unit and a transceiver. The control unit interleaves the starting time of a plurality of active periods of the component carriers in each data transmission cycle in an order, so that the starting time of the active periods of the component carriers may not overlap with each other. The transceiver sends control data to the user equipment via the component carriers during the active periods of the component carriers. The user equipment then receives the control data via the component carriers during the active periods of the component carriers.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A is an exemplary schematic diagram of active periods of three component carriers according to an identical configuration method;

FIG. 2B is an exemplary schematic diagram of active periods of three component carriers according to an independent configuration method;

FIG. 2C is an exemplary schematic diagram of active periods of three component carriers according to an anchor carrier based method;

FIG. 4A is an exemplary schematic diagram of an embodiment of the arrangement of the active periods of a plurality of the component carriers according to the invention;

FIG. 4B is an exemplary schematic diagram of another embodiment of the arrangement of the active periods of a plurality of the component carriers according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
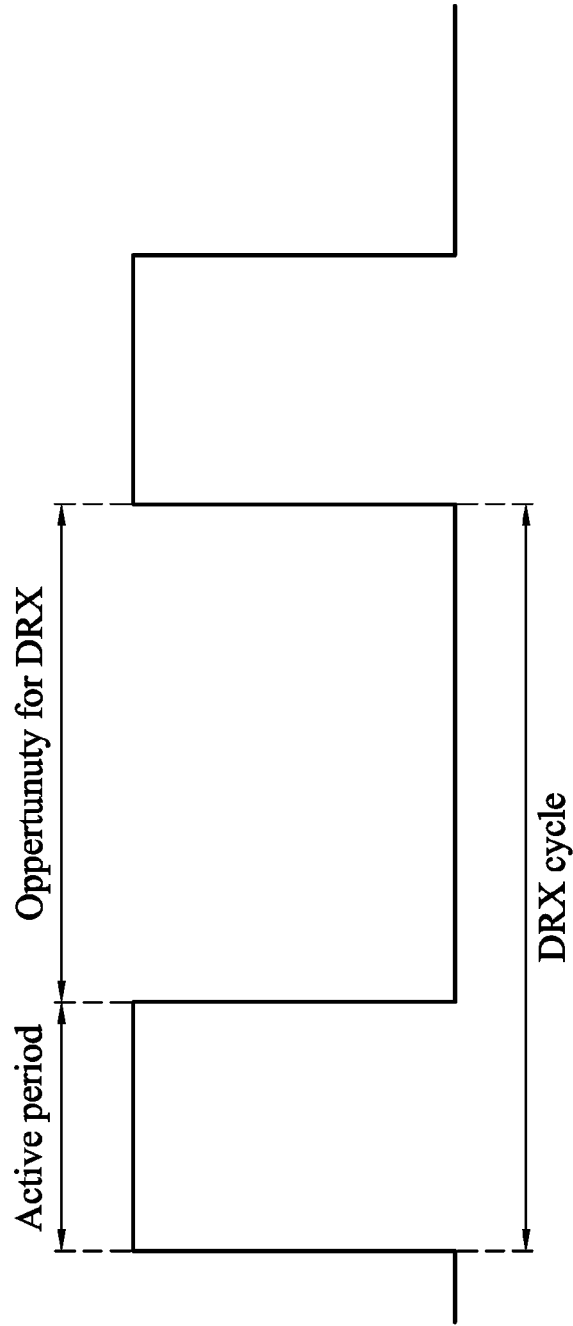
FIG. 1 is an exemplary schematic diagram of signal transmission in a discontinuous reception mode.
Figure 3:
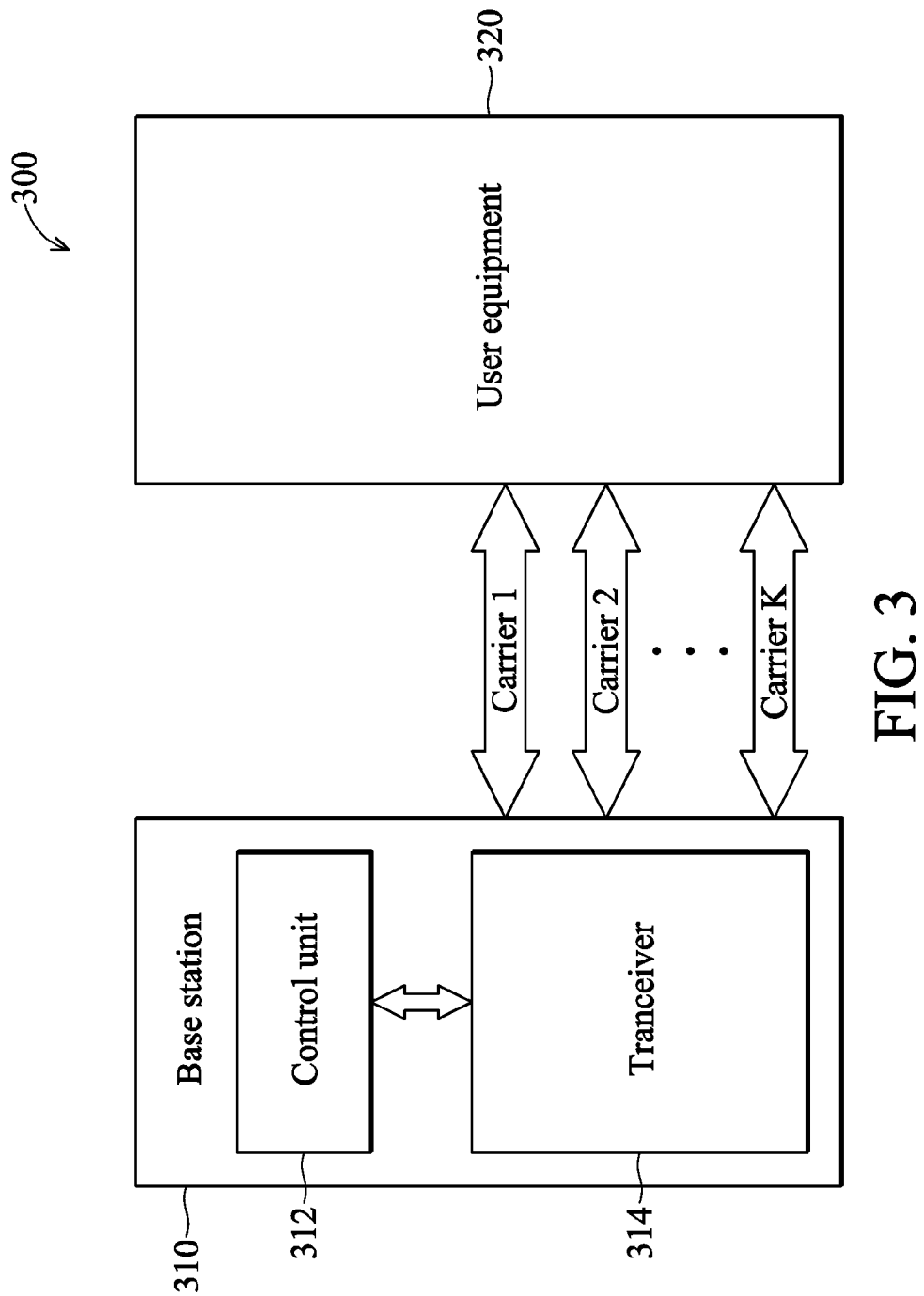
FIG. 3 is an exemplary block diagram of a wireless communication system according to the invention.

FIG. 3 shows an exemplary block diagram of a wireless communication system 300 according to the invention is shown. The wireless communication system 300 comprises a base station 310 and user equipment 320. The base station 310 can be wirelessly coupled to the user equipment 320 via a plurality of the component carriers 1~K with different frequency carriers, and data is communicated between the base station 310 and the user equipment via the component carriers 1~K. The base station 310 also sends control data to the user equipment 320 via the component carriers 1~K to negotiate communication requirements and synchronize communication behavior with the user equipment 320. In one embodiment, the base station 310 sends the control data to the user equipment 320 in a discontinuous reception (DRX) mode, as shown in FIG. 1. In another embodiment, the base station 310 sends the control data to the user equipment in a semi-persistent scheduling (SPS) mode.

A staggered configuration method for sending control data from the base station 310 to the user equipment 320 is provided. A total time period for data transmission between the base station 310 and the user equipment 320 is divided into a series of data transmission cycles with the same duration. In each data transmission cycle, each of the component carriers has corresponding active periods in which the base station 310 transmits control data to the user equipment 320 via the corresponding component carrier, and the starting time of an active period of one component carrier is staggered to the starting time of active periods of other component carriers. In other words, the base station 310 may send control data via one component carrier at a time, and the user equipment 320 receives the control data via one component carrier at a time. The staggered method provides diversity in the design of the spatial and frequency domains with simple configuration.

In one embodiment, the base station 310 comprises a control unit 312 and a transceiver 314. The control unit 312 interleaves a plurality of the starting time of active periods of the component carriers 1~K in each data transmission cycle in an order, so that the starting time of active periods of the component carriers 1~K are staggered. The transceiver 314 then sends control data to the user equipment 320 via the component carriers 1~K during the active periods of the component carriers. The user equipment 320 then receives the control data via the component carriers 1~K during the active periods of the component carriers 1~K. When only one of the component carriers 1~K is active for data transmission at a specific period, the user equipment 320 can apply all of its antennas in the reception control data of the active component carrier to improve the signal quality of the control data received via the active component carrier.

In one embodiment, the control unit 312 arranges the active periods of the component carriers 1~K in each data transmission cycle in an order, so that the starting time of active periods of the component carriers mutually differ by an offset period. Referring to FIG. 4A, an exemplary schematic diagram of an embodiment of the arrangement of the active periods of a plurality of the component carriers according to the invention is shown. Assume that there are three component carriers 1~3 for data transmission between the base station 310 and the user equipment 320. The frequency band of the component carrier 2 is higher than that of the component carrier 1, and the frequency band of the component carrier 3 is higher than that of the component carrier 2. The active period of the component carrier 2 is later than that of the component carrier 1, and the active period of the component carrier 3 is later than that of the component carrier 2. In other words, the active periods of the component carriers having lower frequency bands are earlier than the active periods of the component carriers having higher frequency bands.

Referring to FIG. 4B, an exemplary schematic diagram of another embodiment of the arrangement of the active periods of a plurality of the component carriers according to the invention is shown. Assume that there are three component carriers 1~3 for data transmission between the base station 310 and the user equipment 320. The frequency band of the component carrier 2 is higher than that of the component carrier 1, and the frequency band of the component carrier 3 is higher than that of the component carrier 2. The active period of the component carrier 2 is earlier than that of the component carrier 1, and the active period of the component carrier 3 is earlier than that of the component carrier 2. In other words, the active periods of the component carriers having higher frequency bands are earlier than the active periods of the component carriers having lower frequency bands.

Figure 5B:
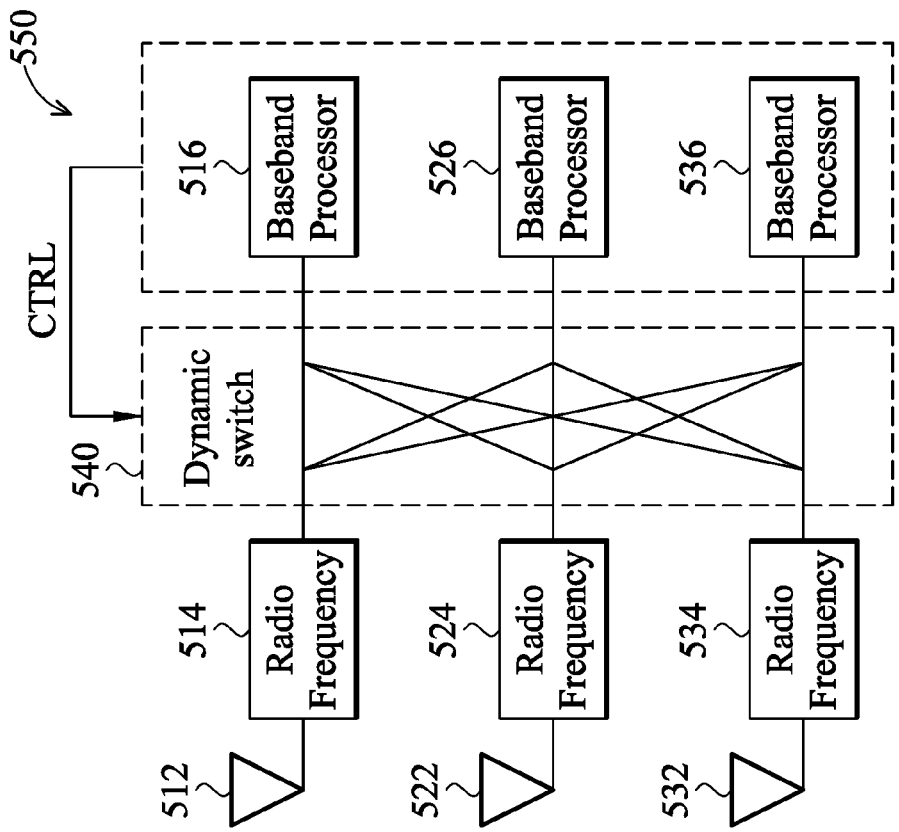
FIG. 5B is an exemplary block diagram of another embodiment of user equipment according to the invention.
Figure 5A:
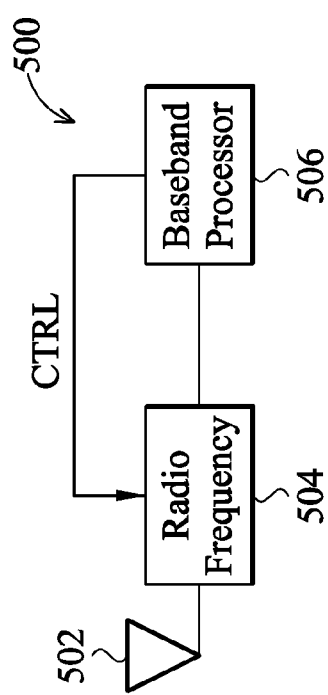
FIG. 5A is an exemplary block diagram of an embodiment of user equipment with a simplified hardware structure according to the invention.

Referring to FIG. 5A, an exemplary block diagram of an embodiment of user equipment 500 according to the invention is shown. The user equipment 500 comprises an antenna 502, a radio frequency module 504, and a base band processor 506. Although there are a plurality of the component carriers for data transmission between a base station and the user equipment 500, there may be only one active component carrier transmitting control data in a specific period due to the offset starting time of active period. Thus, the user equipment 500 may comprise only one antenna 502, one radio frequency module 504, and one base band processor 506. The antenna 502 and the radio frequency module 504 receive a radio signal from the active component carrier during the active period corresponding to the active component carrier. The base band processor 506 then retrieves control data from the radio signal received by the radio frequency module 504. When the active component carrier is changed, the base band processor 506 sends a control signal CTRL to the radio frequency module to adjust a receiving frequency band to that of the active component carrier.

Although there might be only one active component carrier for transmitting control data at a specific period according to the staggered configuration method, depending upon specified circumstances, some component carriers may be simultaneously activated. For a 3GPP LTE system, the specified circumstances comprise retransmission, contention resolution, uplink scheduling request, and grant for pending HARQ retransmission or random access response circumstances. Because the user equipment with the hardware shown in FIG. 5A cannot meet the requirement of the specified circumstances, user equipment with a hardware structure with higher complexity is therefore provided. Referring to FIG. 5B, an exemplary block diagram of another embodiment of user equipment 550 according to the invention is shown. The user equipment comprises three antennas 512, 522, and 532, three radio frequency modules 514, 524, and 534, three base band processors 516, 526, and 536, and a dynamic switch module 540. Each of the antennas 512, 522, and 532 and the corresponding radio frequency modules 514, 524, and 534 receives a radio signal from a base station via one of three component carriers. A digital processing circuit comprising the base band processors 516, 526, and 536 then controls the dynamic switch module 540 to selectively couple the output terminals of the radio frequency modules 514, 524, and 534 with input terminals of the base band processors 516, 526, and 536; thereby dynamically sending the radio signals received by the radio frequency modules 514, 524, and 534 to the base band processors 516, 526, and 536. The base band processors 516, 526, and 536 then retrieve control data from the radio signals.

Figure 6A:
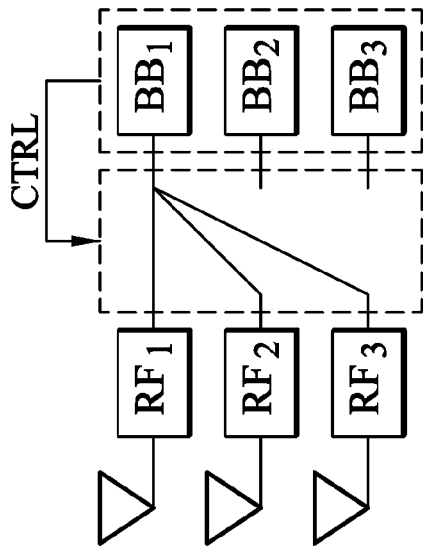
FIG. 6A shows an exemplary independent coupling mode coupling radio frequency modules to base band processors according to the invention.
Figure 6B:
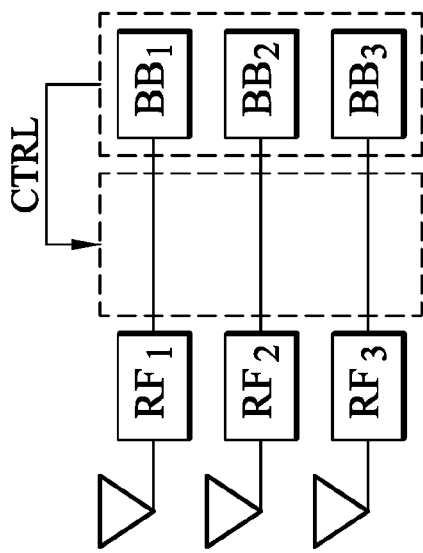
FIG. 6B shows an exemplary combined coupling mode coupling radio frequency modules to base band processors according to the invention.
Figure 6C:
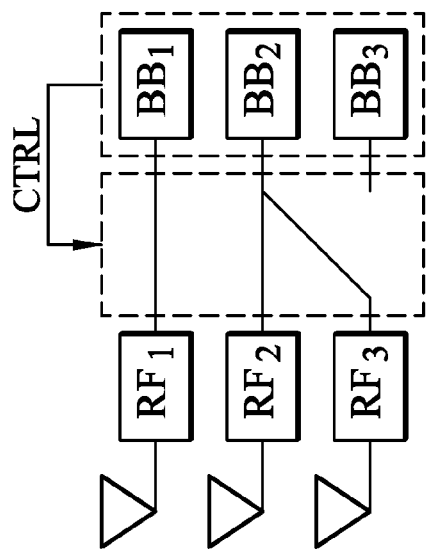
FIG. 6C shows an exemplary hybrid coupling mode coupling radio frequency modules to base band processors according to the invention.

Three modes may be applied to the coupling relationship between the radio frequency modules 514, 524, and 534 and the base band processors 516, 526, and 536. Referring to FIG. 6A, an exemplary independent coupling mode coupling radio frequency modules to base band processors according to the invention is shown. The output terminals of the radio frequency modules $RF_1$, $RF_2$, and $RF_3$ are respectively coupled to the input terminals of the base band processors $BB_1$, $BB_2$, and $BB_3$, and the radio signals transmitted via three different component carriers are respectively processed by the base band processors $BB_1$, $BB_2$, and $BB_3$. Note that one base band processor can process the functions of these the three processors on different time. Referring to FIG. 6B, an exemplary combined coupling mode coupling radio frequency modules to base band processors according to the invention is shown. The output terminals of the radio frequency modules $RF_1$, $RF_2$, and $RF_3$ receive signal at the same carrier and are all coupled to the input terminal of the base band processor $BB_1$, and the radio signals transmitted the same component carriers are all processed by the base band processor $BB_1$. Note that one base band processor can process the functions of the base band processor $BB_1$. Referring to FIG. 6C, an exemplary hybrid coupling mode coupling radio frequency modules to base band processors according to the invention is shown. The output terminal of the radio frequency module $RF_1$ is coupled to the input terminal of the base band processors $BB_1$, and the output terminals of the radio frequency modules $RF_2$ and $RF_3$ are both coupled to the input terminal of the base band processor $BB_2$, where the $RF_2$ and $RF_3$ receive the signals at the same carrier. The radio signals transmitted via a first component carrier is processed by the base band processor $BB_1$, and the radio signals transmitted via a second and a third component carriers are processed by the base band processor $BB_2$. Note that one base band processor can process the functions of the base band processors $BB_1$ and $BB_2$.

Figure 7:
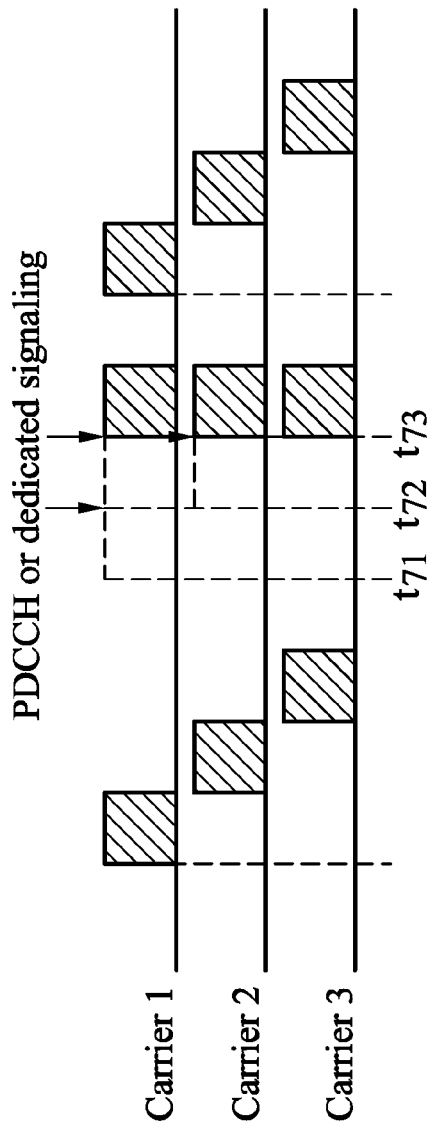
FIG. 7 is an exemplary schematic diagram of the extension of active periods of the component carriers according to an extension signal.

The base station may sometimes simultaneously activate all component carriers to transmit control data to the user equipment. Because the user equipment still receives control data according to the predetermined active periods of the corresponding component carriers, the base station must inform the user equipment of the adjustment of the active periods of the component carriers. In one embodiment, the base station sends an extension signal to the user equipment to dynamically extend active periods of the component carriers. Referring to FIG. 7, an exemplary schematic diagram of the extension of active periods of the component carriers according to an extension signal is shown. In a first data transmission cycle, an active period of a component carrier 1 is earlier than the active periods of the component carriers 2 and 3. In a second data transmission cycle, an extension signal is transmitted from the base station to the user equipment. The starting time of the active period of the component carrier 1 is therefore delayed from time $t_{71}$ to time $t_{73}$, and the starting time of the active period of the component carrier 2 is also delayed from time $t_{72}$ to time $t_{73}$. The extension signal may be a layer-1 physical dedicated control channel (PDCCH) signal, a layer-1 physical HARQ indicator channel (PHICH) signal, a layer-2 MAC control signal, or a layer-3 radio resource control (RRC) signal.

Figure 8:
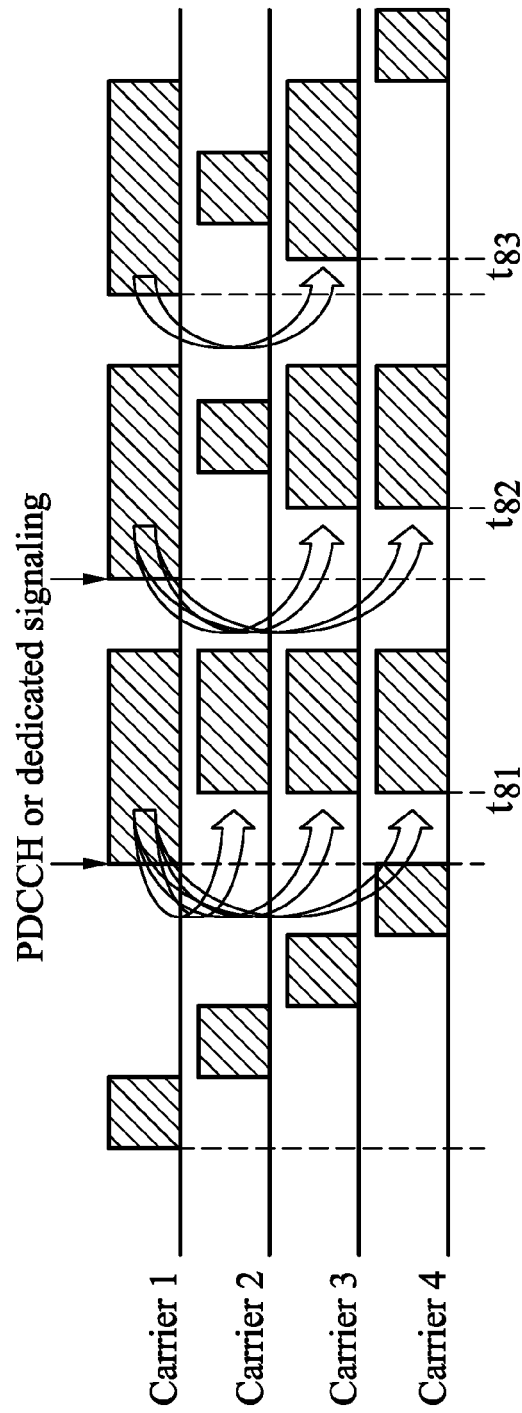
FIG. 8 is an exemplary schematic diagram of the adjustment of the active periods of the component carriers according to an activation signal.

In another embodiment, the base station sends an activation signal to the user equipment via an early activated component carrier to configure the active periods of at least one later-activated component carrier in some of the data transmission cycles, wherein the active period of the early activated component carrier is earlier than that of the later-activated component carrier. Referring to FIG. 8, an exemplary schematic diagram of the adjustment of the active periods of the component carriers according to an activation signal is shown. In a first data transmission cycle, an active period of a component carrier 1 is earlier than the active periods of the component carriers 2, 3, and 4. In a second data transmission cycle, an activation signal is transmitted from the base station to the user equipment via the early-activated component carrier 1, and the activation signal comprises information concerning adjustment of the configuration of the active periods of the later-activated component carriers 2, 3, and 4. The starting time of the active periods of the component carriers 2, 3, and 4 are therefore advanced to time $t_{81}$. Similarly, in a third data transmission cycle, an activation signal is transmitted from the base station to the user equipment via the early-activated component carrier 1, and the activation signal comprises information concerning of adjustment of the configuration of the active periods of the later-activated component carriers 3 and 4. The starting time of the active periods of the component carriers 3 and 4 are therefore advanced to time $t_{82}$. The activation signal may also be a layer-1 physical dedicated control channel (PDCCH) signal, a layer-1 physical HARQ indicator channel (PHICH) signal, a layer-2 MAC control signal, or a layer-3 radio resource control (RRC) signal.

Figure 9:
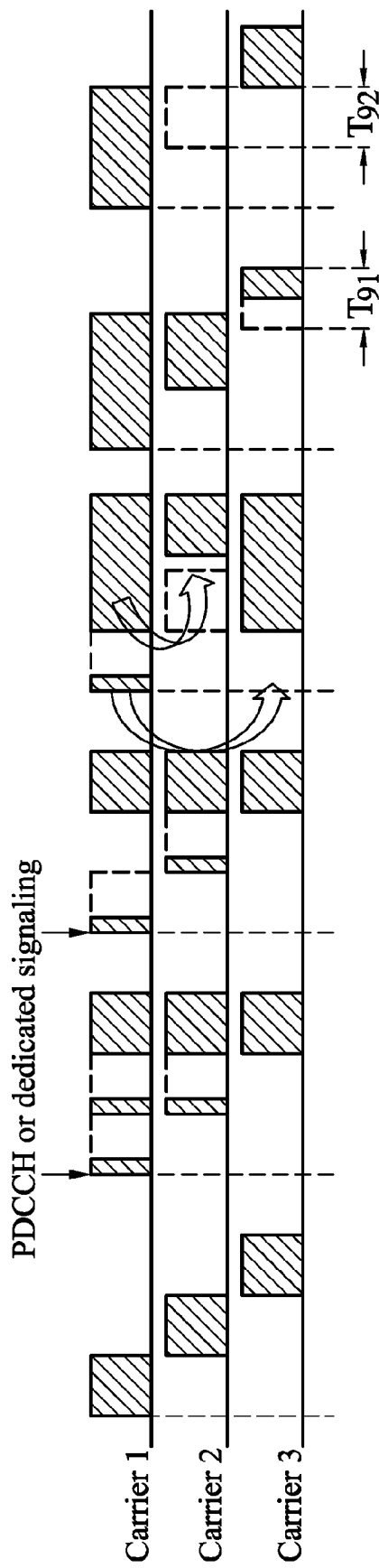
FIG. 9 is an exemplary schematic diagram of the suspension of active periods of the component carriers according to an early suspension signal.

Sometimes the base station does not send control data to the user equipment via component carriers. The user equipment, however, still tries to receive control data via the component carriers during corresponding active periods, leading to meaningless power consumption. To reduce power consumption of the user equipment, the base station may send an early suspension signal to the user equipment to prevent the user equipment from receiving the control data during predetermined active periods of some of the component carriers. Referring to FIG. 9, a schematic diagram of the suspension of active periods of the component carriers according to an early suspension signal is shown. In a first data transmission cycle, an active period of a component carrier 1 is earlier than the active periods of the component carriers 2 and 3. In a second and a third data transmission cycles, extension signals are transmitted from the base station to the user equipment to align the starting time of the active periods of the component carriers 1 and 2 with that of the active period of the component carrier 3. In a fourth data transmission cycle, an activation signal is transmitted from the base station to the user equipment via the early-activated component carrier 1, the active period of the later-activated component carriers 2 is therefore delayed, and the active period of the later-activated component carriers 3 is therefore advanced. In a fifth data transmission cycle, a first early suspension signal is transmitted from the base station to the user equipment, and a first half of the active period of the component carrier 3 is suspended according to the first early suspension signal. In a sixth data transmission cycle, a second early suspension signal is transmitted from the base station to the user equipment, and the active period of the component carrier 2 is suspended according to the second early suspension signal. In one embodiment, the early suspension signal is a layer-1 physical dedicated control channel (PDCCH) signal, a layer-1 physical HARQ indicator channel (PHICH) signal, a layer-2 MAC control signal, or a layer-3 radio resource control (RRC) signal.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data communication method for a wireless communication system, wherein the wireless communication system comprises a base station and user equipment, the base station transmits data to the user equipment via a plurality of the component carriers comprising a series of data transmission cycles, and the method comprises:
   interleaving starting times of a plurality of active periods of the component carriers in each data transmission cycle, wherein the component carriers with the interleaved starting times of the plurality of active periods are transmitted from the base station to the same one user equipment, wherein the interleaved starting times are non-overlapping through an offset period;
   sending control data from the base station to the user equipment via the component carriers during the active periods of the component carriers; and
   sending an activation signal from the base station to the user equipment via an active period of an early activated component carrier to adjust the starting time and the duration of each of the active periods of at least one later-activated component carrier in some of the data transmission cycles, wherein the starting time of the active period of the early activated component carrier is earlier than that of the later-activated component carrier,
   wherein only one active period is present within each data transmission cycle of the early activated component carrier and within each data transmission cycle of the at least one later-activated component carrier,
   wherein the early activated component carrier and the at least one later-activated component carrier all have different carrier frequencies.

2. The data communication method as claimed in claim 1, wherein the starting time of the active periods are interleaved in an order so that the starting time of the active periods of the component carriers do not overlap with each other.

3. The data communication method as claimed in claim 1, wherein the data communication method further comprises:
   receiving the control data by the user equipment via the component carriers during the active periods of the component carriers.

4. The data communication method as claimed in claim 1, wherein the base station sends the control data to the user equipment in a discontinuous reception (DRX) mode.

5. The data communication method as claimed in claim 1, wherein the base station sends the control data to the user equipment in a semi-persistent scheduling (SPS) mode.

6. The data communication method as claimed in claim 1, wherein the component carriers have different frequency bands, and the interleaving step comprises:
   arranging the active periods of the component carriers in each data transmission cycle in an order, so that the active periods of the component carriers mutually differ by an offset period.

7. The data communication method as claimed in claim 6, wherein the active periods of the component carriers having higher frequency bands are earlier than the active periods of the component carriers having lower frequency bands.

8. The data communication method as claimed in claim 6, wherein the active periods of the component carriers having higher frequency bands are later than the active periods of the component carriers having lower frequency bands.

9. The data communication method as claimed in claim 3, wherein the user equipment comprises a radio frequency module and a base band processor, wherein the base band processor selects an active component carrier from the plurality of the component carriers, the radio frequency module receives a radio signal from the base station via the active component carrier, and the base band processor retrieves the control data from the radio signal.

10. The data communication method as claimed in claim 3, wherein the user equipment comprises a plurality of radio frequency modules and a plurality of base band processors, wherein each of the radio frequency modules receive a radio signal from the base station via one of the component carriers, and each of the base band processors retrieve the control data from one of the radio signals.

11. The data communication method as claimed in claim 3, wherein the user equipment comprises a plurality of radio frequency modules and a base band processor, wherein each of the radio frequency modules receive a radio signal from the base station via the same component carrier, and the base band processor retrieves the control data from the radio signals.

12. The data communication method as claimed in claim 3, wherein the user equipment comprises a plurality of radio frequency modules, a plurality of switches, and a plurality of base band processors, wherein each of the radio frequency modules receive a radio signal from the base station via one of the component carriers, the switches selectively couples the radio frequency modules with the base band processors to send the radio signals to the base band processors, and the base band processors retrieve the control data from the radio signals.

13. The data communication method as claimed in claim 1, wherein the data communication method further comprises:
sending an extension signal from the base station to the user equipment to extend the active periods of some of the component carriers, thereby aligning the active periods of all of the component carriers in some of the data transmission cycles.

14. The data communication method as claimed in claim 13, wherein the extension signal is a layer-1 physical dedicated control channel (PDCCH) signal, a layer-1 physical HARQ indicator channel (PHICH) signal, a layer-2 MAC control signal, or a layer-3 radio resource control (RRC) signal.

15. The data communication method as claimed in claim 1, wherein the activation signal is a layer-1 physical dedicated control channel (PDCCH) signal, a layer-1 physical HARQ indicator channel (PHICH) signal, a layer-2 MAC control signal, or a layer-3 radio resource control (RRC) signal.

16. The data communication method as claimed in claim 1, wherein the data communication method further comprises:
sending an early suspension signal from the base station to the user equipment to prevent the user equipment from receiving the control data in the active periods of some of the component carriers in some of the data transmission cycles.

17. The data communication method as claimed in claim 16, wherein the early suspension signal is a layer-1 physical dedicated control channel (PDCCH) signal, a layer-1 physical HARQ indicator channel (PHICH) signal, a layer-2 MAC control signal, or a layer-3 radio resource control (RRC) signal.

18. A wireless communication system, comprising:
a user equipment; and
a base station, transmitting data to the user equipment via a plurality of the component carriers comprising a series of data transmission cycles, and interleaving starting times of a plurality of active periods of the component carriers in each data transmission cycle, wherein the component carriers with the interleaved starting time of the plurality of active periods are transmitted from the base station to the same one user equipment, wherein the interleaved starting times are non-overlapping through an offset period;
wherein the user equipment receives control data via the component carriers during the active periods of the component carriers; and
sending an activation signal from the base station to the user equipment via an active period of an early activated component carrier to adjust the starting time and the duration of each of the active periods of at least one later-activated component carrier in some of the data transmission cycles, wherein the starting time of the active period of the early activated component carrier is earlier than that of the later-activated component carrier,
wherein only one active period is present within each data transmission cycle of the early activated component carrier and within each data transmission cycle of the at least one later-activated component carrier,
wherein the early activated component carrier and the at least one later-activated component carrier all have different carrier frequencies.

19. The wireless communication system as claimed in claim 18, wherein the base station interleaves the starting time of the active periods of the component carriers in each data transmission cycle in an order, so that the starting time of the active periods of the component carriers do not overlap with each other.

20. The wireless communication system as claimed in claim 18, wherein the base station sends the control data to the user equipment via the component carriers during the active periods of the component carriers.

21. The wireless communication system as claimed in claim 20, wherein the base station sends the control data to the user equipment in a discontinuous reception (DRX) mode.

22. The wireless communication system as claimed in claim 20, wherein the base station sends the control data to the user equipment in a semi-persistent scheduling (SPS) mode.

23. The wireless communication system as claimed in claim 18, wherein the component carriers have different frequency bands, and the base station arranges the active periods of the component carriers in each data transmission cycle in an order, so that the active periods of the component carriers mutually differ by an offset period.

24. The wireless communication system as claimed in claim 23, wherein the active periods of the component carriers having higher frequency bands are earlier than the active periods of the component carriers having lower frequency bands.

25. The wireless communication system as claimed in claim 23, wherein the active periods of the component carriers having higher frequency bands are later than the active periods of the component carriers having lower frequency bands.

26. The wireless communication system as claimed in claim 18, wherein the user equipment comprises:
a radio frequency module, receiving a radio signal from the base station via an active component carrier; and
a base band processor, coupled to the radio frequency module, selecting the active component carrier from the plurality of the component carriers, and retrieving the control data from the radio signal.

27. The wireless communication system as claimed in claim 18, wherein the user equipment comprises:
a plurality of radio frequency modules, each receiving a radio signal from the base station via one of the component carriers; and a plurality of base band processors, respectively coupled to one of the radio frequency modules, respectively retrieving the control data from one of the radio signals.

28. The wireless communication system as claimed in claim 18, wherein the user equipment comprises:
a plurality of radio frequency modules, each receiving a radio signal from the base station via the same component carrier, and
a base band processor, coupled to the radio frequency modules, retrieving the control data from the radio signals.

29. The wireless communication system as claimed in claim 18, wherein the user equipment comprises:
a plurality of radio frequency modules, each receiving a radio signal from the base station via one of the component carriers;
a plurality of switches, selectively coupling the radio frequency modules with the base band processors to send the radio signals to the base band processors; and
a plurality of base band processors, retrieving the control data from the radio signals.

30. The wireless communication system as claimed in claim 18, wherein the base station further sends an extension signal to the user equipment to extend the active periods of some of the component carriers, thereby aligning the active periods of all of the component carriers in some of the data transmission cycles.

31. The wireless communication system as claimed in claim 30, wherein the extension signal is a layer-1 physical dedicated control channel (PDCCH) signal, a layer-1 physical HARQ indicator channel (PHICH) signal, a layer-2 MAC control signal, or a layer-3 radio resource control (RRC) signal.

32. The wireless communication system as claimed in claim 18, wherein the activation signal is a layer-1 physical dedicated control channel (PDCCH) signal, a layer-1 physical HARQ indicator channel (PHICH) signal, a layer-2 MAC control signal, or a layer-3 radio resource control (RRC) signal.

33. The wireless communication system as claimed in claim 18, wherein the base station further sends an early suspension signal to the user equipment to prevent the user equipment from receiving the control data in the active periods of some of the component carriers in some of the data transmission cycles.

34. The wireless communication system as claimed in claim 33, wherein the early suspension signal is a layer-1 physical dedicated control channel (PDCCH) signal, a layer-1 physical HARQ indicator channel (PHICH) signal, a layer-2 MAC control signal, or a layer-3 radio resource control (RRC) signal.

35. A base station, wirelessly coupled to user equipment via a plurality of the component carriers comprising a series of data transmission cycles, comprising:
a control unit, interleaving starting times of a plurality of active periods of the component carriers in each data transmission cycle, wherein the component carriers with the interleaved starting times of the plurality of active periods are transmitted from the base station to the same one user equipment, wherein the interleaved starting times are non-overlapping through an offset period;
a transceiver, sending control data to the user equipment via the component carriers during the active periods of the component carriers; and
sending an activation signal from the base station to the user equipment via an active period of an early activated component carrier to adjust the starting time and the duration of each of the active periods of at least one later-activated component carrier in some of the data transmission cycles, wherein the starting time of the active period of the early activated component carrier is earlier than that of the later-activated component carrier,
wherein only one active period is present within each data transmission cycle of the early activated component carrier and within each data transmission cycle of the at least one later-activated component carrier,
wherein the early activated component carrier and the at least one later-activated component carrier all have different carrier frequencies.

36. The base station as claimed in claim 35, wherein the control unit interleaves the starting time of the active periods of the component carriers in each data transmission cycle, so that the starting time of the active periods of the component carriers do not overlap with each other.

37. The base station as claimed in claim 35, wherein the user equipment receives the control data via the component carriers during the active periods of the component carriers.

38. The base station as claimed in claim 35, wherein the transceiver sends the control data to the user equipment in a discontinuous reception (DRX) mode.

39. The base station as claimed in claim 35, wherein the transceiver sends the control data to the user equipment in a semi-persistent scheduling (SPS) mode.

40. The base station as claimed in claim 35, wherein the component carriers have different frequency bands, and the control unit arranges the active periods of the component carriers in each data transmission cycle in an order, so that the active periods of the component carriers mutually differ by an offset period.

41. The base station as claimed in claim 40, wherein the active periods of the component carriers having higher frequency bands are earlier than the active periods of the component carriers having lower frequency bands.

42. The base station as claimed in claim 40, wherein the active periods of the component carriers having higher frequency bands are later than the active periods of the component carriers having lower frequency bands.

43. The base station as claimed in claim 37, wherein the user equipment comprises:
a radio frequency module, receiving a radio signal from the base station via an active component carrier; and
a base band processor, coupled to the radio frequency module, selecting the active component carrier from the plurality of the component carriers, and retrieving the control data from the radio signal.

44. The base station as claimed in claim 37, wherein the user equipment comprises:
a plurality of radio frequency modules, each receiving a radio signal from the base station via one of the component carriers; and
a plurality of base band processors, respectively coupled to one of the radio frequency modules, respectively retrieving the control data from one of the radio signals.

45. The base station as claimed in claim 37, wherein the user equipment comprises:
a plurality of radio frequency modules, each receiving a radio signal from the base station via the same component carrier, and
a base band processor, coupled to the radio frequency modules, retrieving the control data from the radio signals.

46. The base station as claimed in claim 37, wherein the user equipment comprises:
- a plurality of radio frequency modules, each receiving a radio signal from the base station via one of the component carriers;
- a plurality of switches, selectively coupling the radio frequency modules with the base band processors to send the radio signals to the base band processors; and
- a plurality of base band processors, retrieving the control data from the radio signals.

47. The base station as claimed in claim 35, wherein the control unit further controls the transceiver to send an extension signal to the user equipment to extend the active periods of some of the component carriers, thereby aligning the active periods of all of the component carriers in some of the data transmission cycles.

48. The base station as claimed in claim 47, wherein the extension signal is a layer-1 physical dedicated control channel (PDCCH) signal, a layer-1 physical HARQ indicator channel (PHICH) signal, a layer-2 MAC control signal, or a layer-3 radio resource control (RRC) signal.

49. The base station as claimed in claim 35, wherein the control unit further controls the transceiver to send the activation signal.

50. The base station as claimed in claim 49, wherein the activation signal is a layer-1 physical dedicated control channel (PDCCH) signal, a layer-1 physical HARQ indicator channel (PHICH) signal, a layer-2 MAC control signal, or a layer-3 radio resource control (RRC) signal.

51. The base station as claimed in claim 50, wherein the control unit further controls the transceiver to send an early suspension signal to the user equipment to prevent the user equipment from receiving the control data in the active periods of some of the component carriers in some of the data transmission cycles.

52. The base station as claimed in claim 51, wherein the early suspension signal is a layer-1 physical dedicated control channel (PDCCH) signal, a layer-1 physical HARQ indicator channel (PHICH) signal, a layer-2 MAC control signal, or a layer-3 radio resource control (RRC) signal.

53. A user equipment, wirelessly coupled to a base station via a plurality of component carriers, comprising:
- a plurality of radio frequency modules, each receiving a radio signal from the base station via one of the component carriers during a plurality of active periods of the corresponding component carriers; and
- at least one base band processor, coupled to the radio frequency modules, retrieving control data from the radio signals received by the radio frequency modules;
- wherein the base station transmits the control data to the user equipment via the component carriers to the user equipment during the active periods of the component carriers, and starting times of the plurality of active periods of the component carriers are interleaved in each data transmission cycle, wherein the component carriers with the interleaved starting times of the plurality of active periods are transmitted from the base station to the same one user equipment, wherein the interleaved starting times are non-overlapping through an offset period; and
- sending an activation signal from the base station to the user equipment via an active period of an early activated component carrier to adjust the starting time and the duration of each of the active periods of at least one later-activated component carrier in some of the data transmission cycles, wherein the starting time of the active period of the early activated component carrier is earlier than that of the later-activated component carrier, wherein only one active period is present within each data transmission cycle of the early activated component carrier and within each data transmission cycle of the at least one later-activated component carrier, wherein the early activated component carrier and the at least one later-activated component carrier all have different carrier frequencies.

54. The user equipment as claimed in claim 53, wherein the base station interleaves the starting time of the active periods of the component carriers in each data transmission cycle in an order, so that the starting time of the active periods of the component carriers do not overlap with each other.

55. The user equipment as claimed in claim 53, wherein the user equipment receives the control data from the base station in a discontinuous reception (DRX) mode.

56. The user equipment as claimed in claim 53, wherein the user equipment receives the control data from the base station in a semi-persistent scheduling (SPS) mode.

57. The user equipment as claimed in claim 53, wherein the component carriers have different frequency bands, and the base station arranges the active periods of the component carriers in each data transmission cycle in an order, so that the active periods of the component carriers mutually differ by an offset period.

58. The user equipment as claimed in claim 57, wherein the active periods of the component carriers having higher frequency bands are earlier than the active periods of the component carriers having lower frequency bands.

59. The user equipment as claimed in claim 57, wherein the active periods of the component carriers having higher frequency bands are later than the active periods of the component carriers having lower frequency bands.

60. The user equipment as claimed in claim 53, wherein the base band processor selects an active component carrier from the plurality of the component carriers, and retrieves the control data from the radio signal corresponding to the active component carrier.

61. The user equipment as claimed in claim 53, wherein the at least one base band processor comprises a plurality of base band processors, and the plurality of base band processors are respectively coupled to one of the radio frequency modules and respectively retrieve the control data from one of the radio signals.

62. The user equipment as claimed in claim 53, wherein the at least one base band processor comprises a plurality of base band processors, and the user equipment comprises:
- a plurality of switches, selectively coupling the radio frequency modules with the base band processors to send the radio signals to the base band processors;
- wherein the plurality of base band processors retrieve the control data from the radio signals received via the switches.

63. The user equipment as claimed in claim 53, wherein the base station further sends an extension signal to the user equipment to extend the active periods of some of the component carriers, thereby aligning the active periods of all of the component carriers in some of the data transmission cycles.

64. The user equipment as claimed in claim 63, wherein the extension signal is a layer-1 physical dedicated control channel (PDCCH) signal, a layer-1 physical HARQ indicator channel (PHICH) signal, a layer-2 MAC control signal, or a layer-3 radio resource control (RRC) signal.

65. The user equipment as claimed in claim 53, wherein the activation signal is a layer-1 physical dedicated control channel (PDCCH) signal, a layer-1 physical HARQ indicator channel (PHICH) signal, a layer-2 MAC control signal, or a layer-3 radio resource control (RRC) signal.

66. The user equipment as claimed in claim 53, wherein the base station further sends an early suspension signal to the user equipment to prevent the user equipment from receiving the control data in the active periods of some of the component carriers in some of the data transmission cycles.

67. The user equipment as claimed in claim 66, wherein the early suspension signal is a layer-1 physical dedicated control channel (PDCCH) signal, a layer-1 physical HARQ indicator channel (PHICH) signal, a layer-2 MAC control signal, or a layer-3 radio resource control (RRC) signal.

* * * * *